United States Patent
Kajihara

(10) Patent No.: US 7,543,127 B2
(45) Date of Patent: Jun. 2, 2009

(54) COMPUTER SYSTEM

(75) Inventor: Masao Kajihara, Tokyo (JP)

(73) Assignee: Nokia Corporation, Espoo (FI)

( * ) Notice: Subject to any disclaimer, the term of this patent is extended or adjusted under 35 U.S.C. 154(b) by 257 days.

(21) Appl. No.: 11/339,095

(22) Filed: Jan. 24, 2006

(65) Prior Publication Data
US 2006/0174079 A1 Aug. 3, 2006

(30) Foreign Application Priority Data
Jan. 28, 2005 (JP) ............................. 2005-021482

(51) Int. Cl.
*G06F 12/00* (2006.01)
(52) U.S. Cl. .................. 711/163; 711/118; 711/123; 711/125; 711/170; 711/173
(58) Field of Classification Search .............. 711/118, 711/123, 125, 152–153, 163, 170, 173; 710/200
See application file for complete search history.

(56) References Cited

U.S. PATENT DOCUMENTS 5,237,616 A 8/1993 Abraham et al. ............. 380/49
6,952,754 B2 * 10/2005 O'Connor et al. ........... 711/125
2003/0046570 A1 3/2003 Ronkka et al. .............. 713/193
2006/0047958 A1 * 3/2006 Morais ....................... 713/166

FOREIGN PATENT DOCUMENTS

| JP | 63284650 | 11/1988 |
|----|----------|---------|
| JP | H05-225053 | 9/1993 |

* cited by examiner

*Primary Examiner*—Jasmine Song
(74) *Attorney, Agent, or Firm*—Harrington & Smith, PC

(57) ABSTRACT

A technology for allowing the smooth acquisition of required data when a processor switches working modes in a computer system is provided. According to one aspect of the present invention, the present invention can provide a computer system including a processor having a plurality of working modes, each having a different privilege level from each other; an exclusive memory area related to a selected one of said plurality of working modes; and a connecting means for connecting said processor with said exclusive memory, depending on said working mode.

24 Claims, 3 Drawing Sheets

COMPUTER SYSTEM

FIELD OF INVENTION

The present invention relates to a computer system, and more specifically, to an architecture with a processor and storage devices.

BACKGROUND ART

In computer systems, as processors increase in speed, the difference in processing speeds between high-speed processors and low-speed main memory becomes a serious problem in improving the processing speed of the entire system. To solve this problem, a means known as cache or caching is used.

Caching is a method of taking account of the difference in speed between them by mounting a high-speed cache memory between high-speed processors and low-speed main memory. In many cases, the term "cache" is used for cache memory. When the processor accesses data, it first searches for data in the cache memory, and only if there is no data, the processor accesses the main memory. Cache memory is comprised of SRAM, which is very fast, in many cases, and is fast enough to synchronize with the processor, but it is undesirable to equip with a large-volume cache memory because it is expensive. Recently, cache has adopted a multistage structure to support even higher speeds of processors in many cases. Recent CPUs use very high-speed and expensive memory in the tens of kilobytes for the primary cache that is closest to the processors, and memory that is a lower speed but less expensive than the memory for the primary cache in hundreds of kilobytes for a secondary cache between the primary cache and main memory. Some computer systems use a third cache between the secondary cache and main memory.

In many cases, two caches—instruction cache and data cache—are mounted for the primary cache for recent processors. As the names suggest, instruction cache handles data regarding instructions, and data cache handles other data. When, for example, a calculation such as "1+3" is performed, the instruction cache handles the "+", which is an addition operation command, and the data cache handles the "1" and "3". Furthermore, in order to improve the hit rate of cache, the following method called set-associative is used: dividing cache memory into multiple blocks to enable the storage of multiple pieces of data having the same index therein. For detailed information about set-associative, see Japanese Unexamined Patent Application Publication H05-225053 (Patent family of U.S. Pat. No. 5,353,424 in Japan).

Next, operating systems (OS) used in recent computer systems have kernel mode and user mode. These support different working modes of the processors. The OS uses the privilege mode of processors to execute programs for kernel mode, and the non-privilege mode of CPU or cache to execute programs for user mode.

Access rights to hardware resources vary between privilege mode and non-privilege mode. Processors allow access to any hardware resources, such as main memory, hard disks, networks, and printers, for programs working in privilege mode. Conversely, processors restrict access to hardware resources for programs working in non-privilege mode. The OS can protect itself from crashes or invalid programs by properly selecting kernel mode or user mode in which the programs are executed.

Recent processors are equipped with a plurality of working modes, each working mode having a different privilege level associated with it. If privilege levels differ, accessible memory areas also differ, and available instructions and access rights to hardware resources vary. Many operating systems use two of the possible privilege levels for kernel mode and user mode. Working mode for processors is switched by instructions from the OS.

It will be appreciated that a high frequency data group (i.e. a data group to which frequent access is needed) in a given working mode (e.g. kernel mode) differs from a high frequency data group in another working mode (e.g. user mode) with a different privilege level. Therefore, immediately after processors change working modes, there are many cases in which data used in that working mode is not stored in the cache, and the processors cannot obtain the required data unless they access the main memory. Requiring processors to access the main memory, which is slow speed, increases waiting time for processors and makes processing speed slow. In addition, because the electrical power required for processors to access the main memory is greater than the electrical power required for them to access the cache, extra electrical power will be consumed. Furthermore, because processors consume electrical power even while the processors wait for data from the main memory, this is also a waste of power. Moreover, for processors equipped with pipelines, if data does not come, there is a possibility of pipeline obstruction in which the pipeline process may be obstructed, leading to further wasted consumption of electrical power. Such wasted consumption of electrical power means shortening of the work time of electronics devices driven by battery, and that is especially undesirable for mobile electronics devices such as laptop computers and mobile phones that use batteries on many occasions.

The prior art is described by using FIG. 3, which is a block diagram for describing conventional computer systems. A computer system 1008 has a CPU 108 and a main memory 27. The CPU 108 is one in which a core part of operation and control, the cache, and an external interface are integrated on a board into a single LSI chip, called the central processing unit (CPU). In addition, part of the DSP has a structure in which an operation core, a cache, and an external interface are integrated into a single LSI chip, similar to the CPU 108. In FIG. 3, the core part for operation and control is represented by a processor 11, and the processor 11 contains a data decoder, a data control unit, a scheduler, an arithmetic logical operation unit, and a floating-point operation unit therein. In some cases, the processor 11 itself is called the CPU. The CPU 108 is equipped with a two-stage cache, and furthermore, a primary cache is divided into instruction cache and data cache. In FIG. 3, the controller for primary instruction cache is represented by 13, and the memory for primary instruction cache is represented by 15. The controller for primary data cache is represented by 17, and the memory for primary data cache is represented by 19. The primary data cache controller 17 and primary data cache controller 19 are connected to a secondary cache 21. The CPU 108 has a bus interface 23 to connect to external devices, and the CPU 108 is also connected to a main memory 27, which is the main memory of the computer system 1008. In many cases, high-speed and expensive SRAM modules are used for cache memories 15, 19, and 21, and DRAM modules, which are lower speed and less expensive than SRAM, are used for the main memory. The CPU 108 is mounted on a lead frame and enclosed by a molded resin, and this is sold as a product. When the computer system 1008 is turned on, an OS 29 is loaded in the main memory 27 to make the CPU 108 work as an information processing device.

For example, the processor 11 has four working modes in which the privilege levels differ, and their working modes are called working modes 0 through 3, respectively. Working mode 0 is the highest privilege level that allows access to the hardware without any restriction. Working mode 3 is the lowest privilege level that significantly restricts access to the hardware. The OS 29 changes working mode for the processor 11 to 0 when executing programs for kernel mode, and changes it to 3 when executing programs for user mode. The processor 11 has CPU instructions for switching working modes, and the OS 29 can use these CPU instructions to switch working mode for the processor 11.

When the OS 29 executes programs for kernel mode, data frequently used in working mode 0 is stored in the cache memory 15. Here, the OS 29 may switch the working mode for the processor 11 to 3in order to switch to user mode. The memory area frequently used in working mode 3, however, completely differs from the memory area frequently used in working mode 0, in many cases. Therefore, the possibility that data required for working mode 3 is not stored in the cache memory 15 is very high immediately after the working mode is switched to 3. The processor 11 must retrieve required data from the main memory 27 immediately after the working mode is switched to 3. Once data is retrieved, it is stored in the data cache memory 15, and when the same data is required the next time, it can be obtained from the cache memory 15.

However, data stored in working mode 0 is removed from the cache memory 15 by being overwritten with data used in working mode 3 in this process. Therefore, when a switch from user mode to kernel mode is performed, and the processor 11 changes working mode to 0, the processor 11 must retrieve required data from the main memory 27 because data required for the processor 11 is not stored in the cache memory 15. In this manner, access to the main memory 27 by the processor 11 occurs in the conventional computer system 1008 because a switching is performed between kernel mode and user mode. As described above, accessing the main memory 27 takes longer time than accessing cache memory 15 and requires extra electrical power. Because some applications switch between kernel mode and user mode hundreds or thousands of times per second, the effect on delaying the process and electrical power consumption is significant.

SUMMARY OF THE INVENTION

The object of the present invention is to provide technology by which processors can smoothly obtain required data when switching among working modes in a computer system.

According to one aspect of the present invention, the present invention can provide a computer system comprising: a processor comprising a plurality of working modes, each having a different privilege level from each other; an exclusive memory area related to a selected one of said plurality of working modes; and a connecting means for connecting said processor with said exclusive memory area depending on said working mode.

According to this embodiment, because the processor can use an exclusive memory area in the switched mode when the working mode for the processor is switched, access to the required data can be smoothly performed. Connection between the processor and the exclusive memory area can be performed by a physical switch or a logical switch. A logical switch can be achieved by using a logical circuit that associates the address of the data that the processor requests to access with a storage location for data in the exclusive memory area. Preferably, the exclusive memory area is achieved by using storage media that is the highest speed possible, such as SRAM.

A computer system having the features described above may be provided with an exclusive memory area from which the processor reads data in working mode for each of a plurality of working modes that the processors has. In addition, the exclusive memory area may be provided for only the selected one of multiple working modes. For example, when the processor has four working modes, the configuration may be one in which the exclusive memory area is provided for each of four working modes, or it may also be one in which the exclusive memory area is provided only for the first working mode and a common memory area is provided for other working modes. The increase in manufacturing costs can be prevented by providing an exclusive memory area for only high frequency working mode. An exclusive memory area may be achieved by using a physically exclusive storage medium, or by logically dividing a certain area in a given storage medium. In the latter case, the abovementioned connecting means may be a logical switch.

Furthermore, in a computer system having the features described above, if a plurality of exclusive memory areas are provided, this can be implemented using a physically different storage medium for each of the exclusive memory areas or different areas in the same storage medium. If the former configuration is adopted, the configuration may be simpler than the latter one, and if the latter configuration is adopted, a more flexible configuration than the former can be achieved.

The latter approach, which is an embodiment in which a plurality of exclusive memory areas are provided by logically dividing the same storage medium, can be implemented by having a logical circuit in which, for example, the abovementioned connecting means associates the address of the data that the processor requires with a data storage location in logical exclusive storage media. In addition, preferably, it is configured to enable a change in the division number and the size (volume) of divided segments. This means that it is preferably configured to allow a change in the number of exclusive memory areas and the volume. In such a configuration, an embodiment with exclusive memory areas that have good memory access efficiency can be flexibly determined and achieved by monitoring the usage frequency of each working mode for the processor. For example, when the volume of a memory medium is 64 KB, and a processor has four working modes, the following cases are possible: a 16-KB exclusive memory area is assigned for each of the four working modes in some instances, and 32 KB is assigned for the first working mode and the remaining 32 KB is used as a common memory area for all other working modes for reading data in other instances.

A change in the division number and size of segments in a storage medium used for exclusive memory area is directly performed by the processor with the control. Preferably, the processor monitors the usage status for each working mode and independently adjusts the number and size of exclusive memory areas that are most efficient. More preferably, it is configured to change the number, and the size of exclusive memory areas can be performed dynamically even during the execution of applications. If there is a computer program collaborating with a computer system having the features described above according to the present invention, a configuration allowing changes in the number and size of exclusive memory areas by means of instructions from such a program is also possible. The program that preferably has such features is the operating system.

In one embodiment, computer systems having the features described above according to the present invention can be configured to comprise a first storage medium and a second storage medium that is faster than the first storage medium, wherein the exclusive memory area is implemented within the second storage medium.

In a computer system having the features of such an embodiment, for example, the first memory can be a main memory, and the second memory can be a cache memory. With this, it can be configured so that the cache memory has an exclusive memory area exclusively used in a certain mode of the processor, and high frequency data in a working mode to which that exclusive memory corresponds can be stored. In the embodiment described above, the set-associative method cache may be used for exclusive memory areas.

In a computer system having the features of the embodiment described above, the number of accesses to the main memory that is slow to be accessed can be fewer than the number in the system without such features because there is a high possibility that the processor will soon obtain the required data from cache memory that is faster to access immediately after it changes working modes. As a result, in addition to smooth cache access being achieved, greater savings of the following electrical power are possible compared to the prior art: electrical power consumed when the processor waits for data from the main memory, and electrical power consumed by the processor accessing the main memory. Furthermore, if the embodiment described above is applied to a computer system equipped with processors having pipelines, the occurrence of the pipeline obstructions caused by the data transfer delay can be decreased, and the electrical power consumed during the pipeline obstruction can be saved.

According to another aspect of the present invention, the present invention can provide a computer system comprising: a processor comprising a first working mode, and a second working mode having a different privilege level from said first working mode; a first memory area accessed by said processor during said first working mode; and, a second memory area accessed by said processor during said second working mode. A computer system having such features can take the form of an embodiment in which, data loaded from outside is stored in the first memory area when said processor is in the first working mode, and data loaded from outside is stored in the second memory area when said processor is in the second working mode. The first memory area and second memory area may be configured separately by using physically different storage media, or by using different logical segments on the same storage medium.

The computer system having features described above can also be applied to a computer system having cache, and the first and second memory areas described above can be applied to the cache. Because these caches are accessed in a certain mode, smoother cache access is achieved, and the saving of electrical power consumption for cache access can be expected.

In light of the above, the present invention can provide a computer program collaborating with the computer system having the features described above and comprising instructions to instruct said processor of changes in the number or size of said exclusive memory areas. Preferably, such a program is applied to the operating system, for example.

The computer system provided by the present invention can include an embodiment integrated as a single-chip LSI. Such an LSI can be sold as a product by being enclosed in a package. In addition, the computer system provided by the present invention can include an embodiment that it is a mobile electronics device. A mobile electronics device is an electronics device that can be used while being taken along with the user, such as cell phones, PDAs, laptop computers, mobile TV receivers, mobile music/movie players, digital cameras, and video recorders. As for the computer system according to the present invention, savings in electrical power consumption for cache access can be expected because it achieves smoother cache access. Therefore, the advantageous application area of the present invention is mobile electronics devices that are often driven by battery.

According to the present invention, in a computer system, the processor can obtain required data smoothly when the processor switches working modes.

DETAIL DESCRIPTION OF THE PREFERRED EMBODIMENT

Figure 1:
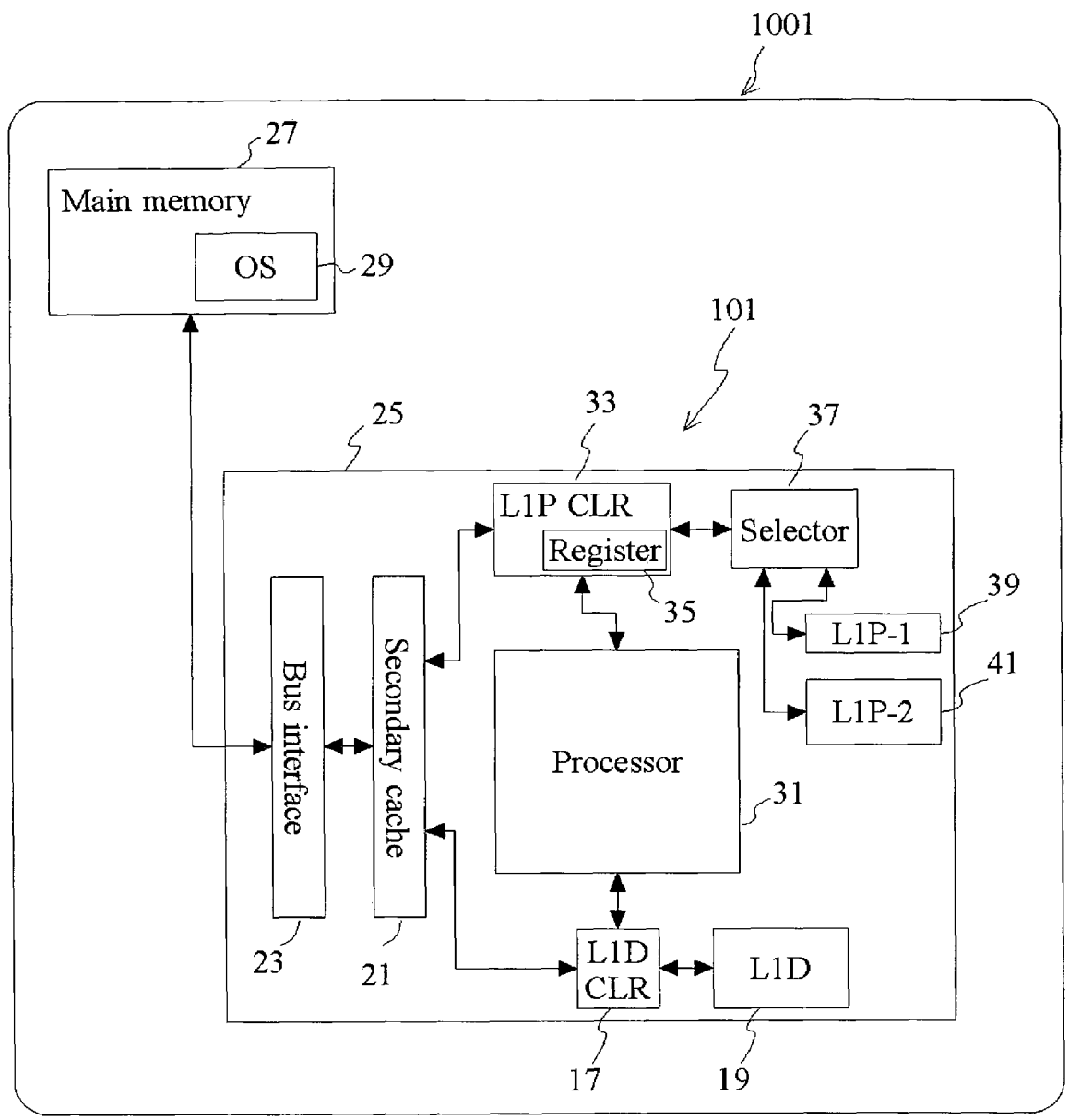
[FIG. 1] Block diagram to describe an example of a computer system to which the present invention applies.

A suitable embodiment of the present invention is described with reference to the attached figures below. FIG. 1 is a block diagram for describing an example of a computer system to which the present invention is applied.

Figure 3:
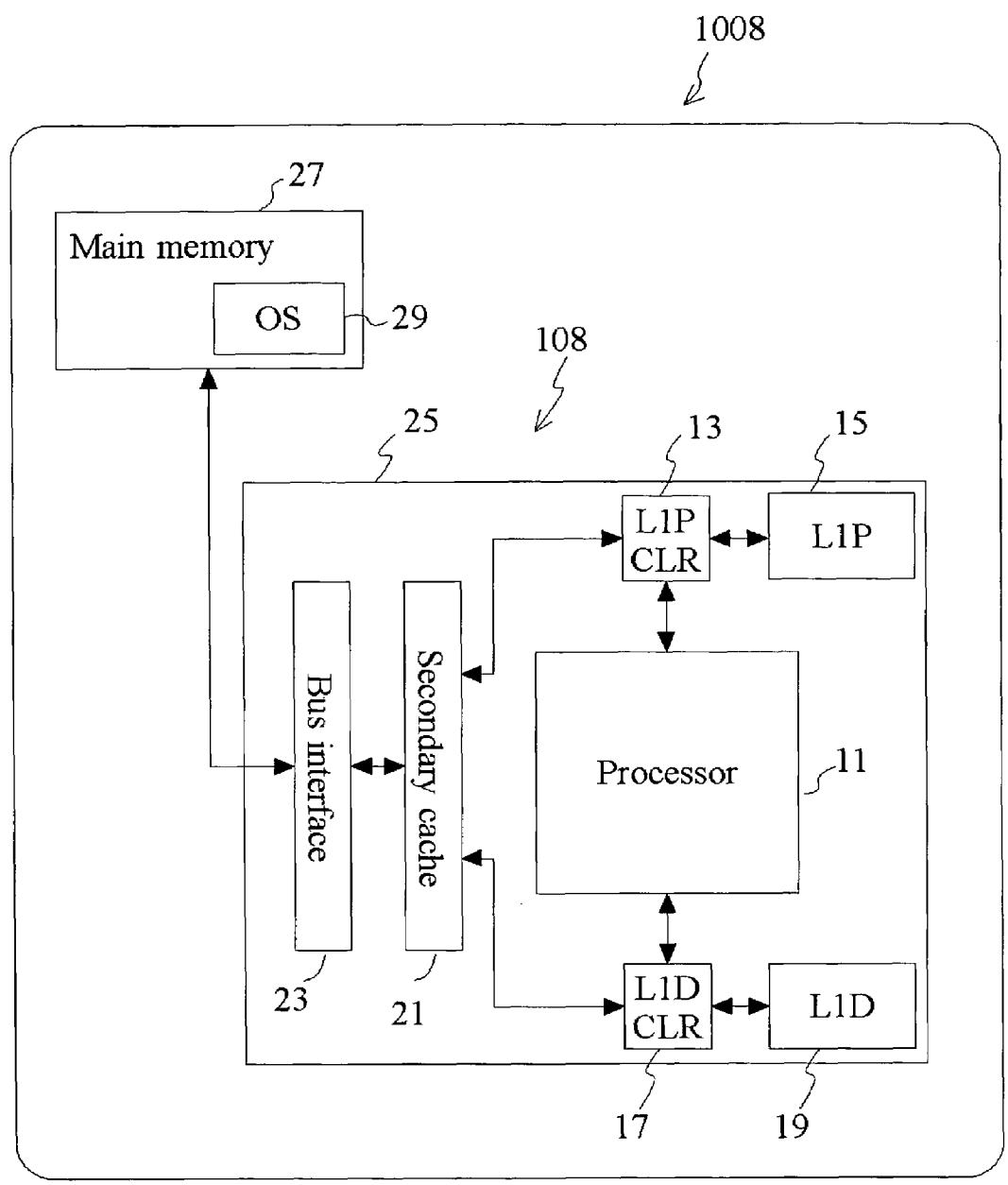
[FIG. 3] Diagram to describe the prior art.

A computer system 1001, which is an embodiment of the present invention, has a CPU 101 and a main memory 27 similar to the computer system 1008 described in FIG. 3. The CPU 101, similar to the CPU 108 described in FIG. 3, is a single LSI chip in which a core part for operation and control, a cache, and an external interface are integrated on a board 25, and it can be sold as a product by being mounted on a lead frame and enclosed by a molded resin. The CPU 101 has a processor 31, a primary instruction cache controller 33, a cache selector 37, a first primary cache memory 39, a second primary cache memory 41, a primary data cache controller 17, a primary data cache memory 19, a secondary cache 21, and a bus interface 23. In addition, the CPU 101 is connected to the main memory 27, which is the main memory for the computer system 1001, through the bus interface 23. When the computer system 1001 is turned on, the OS 29, which makes the CPU 101 work as an information process device, is loaded in the main memory 27. The configuration elements of the computer system 1001 mentioned above have been assigned the same code for the same configuration element as the computer system 1008 described as the prior art in FIG. 3, so further description will be omitted.

The processor 31 of the CPU 101, similar to the processor 11 in FIG. 3, has four working modes, referred to as working modes 0 through 3, with different privilege levels, and it can have all the features that the processor 11 has. The processor 31 is, however, different from the processor 11, in that it can notify the working mode externally when the working mode is changed. The primary instruction cache controller 33 can have all features of the primary instruction cache controller 13 in FIG. 3, but it is different in terms of having a register 35 that holds the working mode of the processor 31. The processor 31 is configured to change the status of the register 35 when the working mode is changed, and other parts can be made completely identical to processors in the prior art.

The CPU 101 in this embodiment has the cache selector 37 and two primary cache memories 39 and 41. The cache selector 37 connects the primary instruction cache controller 33 to the first primary instruction cache memory 39 when it checks the status of the register 35, and the status of the register 35 indicates working mode 0. In addition, if the status of the register 35 indicates either one of the CPU's working modes 1 through 3, it connects the primary instruction cache controller 33 to the second primary instruction cache memory 41. Therefore, the first primary instruction cache memory 39 is an exclusive cache memory used for working mode 0 of the processor 31. The second primary instruction cache memory 41 is a common cache memory used in all working modes 1 through 3 of the processor 31, but the second primary instruction cache memory is virtually an exclusive cache memory for mode 3 as well because the OS 29, which makes the CPU 101 work as an information process device, uses only the two modes 0 and 3 as working modes of the processor 31. If the OS uses more working modes, it is also possible to provide third and fourth cache memories and to connect them to the cache selector 37. If multiple cache memories are implemented by also using physically independent memories in this embodiment, the cache selector 37 can be made comparatively easily using a multiplexer. As the cache memories 39 and 41 are drawn in different sizes in FIG. 1, the volume of multiple cache memories connecting to the cache selector 37 may be all the same or different from one another. Moreover, it can also be configured so that the set-associative method cache is used for some or all of the multiple cache memories connecting to the cache selector 37.

Next, the behavior of the computer system 1001 will be described.

The OS 29 changes the working mode of the processor 31 to the highest privilege level 0 when executing programs for kernel mode and to the lowest privilege level 3 when executing programs for user mode, similar to the computer system 1008 described in FIG. 3.

When the OS 29 executes programs for kernel mode, the processor 31 works in working mode 0. The status of the register 35 indicates that the processor 31 works in working mode 0, and the cache selector 37 connects the first primary instruction cache memory 39 to the primary instruction cache controller 33. Therefore, the processor 31 is allowed to access the cache memory 39.

In working mode 0, data frequently used by the processor 31 in working mode 0 is stored in the primary instruction cache memory 39. If required data is not stored in the cache memory 39, the data must be retrieved from the main memory 27. However, once retrieved data is stored in the cache memory 39, it can obtain the data from the cache memory 39 when the processor 31 needs the data next time.

Next, in order to execute programs for user mode, the OS 29 sends an instruction to the processor 31 to switch the mode to 3. The processor 31, which received the mode switching instruction, switches its own working mode to 3 and changes the status of the register 35 to indicate that the processor 31 is working in mode 3. With this, the cache selector 37 connects the second primary instruction cache memory 41 with the primary instruction cache controller 33. Therefore, the processor 31 is disconnected from the cache memory 39 and allowed to access the cache memory 41. Then data frequently used by the processor 31 in working mode 3 is stored in the primary instruction cache memory 41.

In order to execute programs for kernel mode again, the OS 29 sends data to the processor 31 for switching the working mode to 0. Then the processor 31 disconnects from the cache memory 41 and connects to the cache memory 39 by means of the cache selector 37. At this time, the data frequently used by the processor 31 in working mode 0 is left in the cache memory 39. The processor 39 can obtain required data from the cache memory 39 in working mode 0 immediately after the working mode is switched to 0 again. Therefore, the need for the processor 31 to access the main memory 27 after switching working mode is decreased compared to the prior art, and the processor 31 can obtain required data for a short time.

In a similar manner, it is thought that the OS 29 sends an instruction to the processor 31 for switching the working mode to 3 in order to execute programs for user mode again. When the working mode of the processor 31 is switched to 3, the processor 31 is connected to the cache memory 41 by the cache selector 37 described above. Because data frequently used by the processor 31 in working mode 3 is left in the cache memory 41 at this time, the following possibility increases: the processor 31 can obtain required data from the cache memory 41 in working mode 3 immediately after the working mode is switched to 3.

As described above, the computer system 1001 that is an embodiment of the present invention can decrease the need for the processor to access the main memory after switching the working mode for the processor compared to the prior art. Therefore, the computer system 1001 that is an embodiment of the present invention can save electrical power consumed while the processor waits for data from the main memory and is required for the processor to access the main memory. Furthermore, when the processor 31 is a processor having pipelines, the occurrence of pipeline obstruction caused by the data transfer delay can be decreased, and the electrical power consumed during the pipeline obstruction can be saved. Because some applications switch between kernel mode and user mode hundreds or thousands of times per second, the effect of saving electrical power by the embodiment described here is significantly high.

In this embodiment, the processor 31 can be made in the same manner as conventional processors, and there is no need to especially focus on multiple primary instruction caches except that the processor 31 is configured to reflect switching of the working mode to the register 35. As for the OS, there is no need to especially focus on multiple primary instruction caches, either. Therefore, the CPU 101 that is an embodiment of the present invention is not difficult to manufacture and is highly compatible with conventional computer systems.

In the embodiment described above, exclusive caches supporting working modes for a processor were provided only for the primary instruction cache, but exclusive caches supporting working modes for a processor can also be provided for the primary data caches 17 and 19 and the secondary cache 17 in the same configuration. In addition, computer systems that have a third cache between the CPU 101 and main memory 27 also exist, but in that case, exclusive caches supporting working modes for a processor can also be established for the third cache as well as those above.

Figure 2:
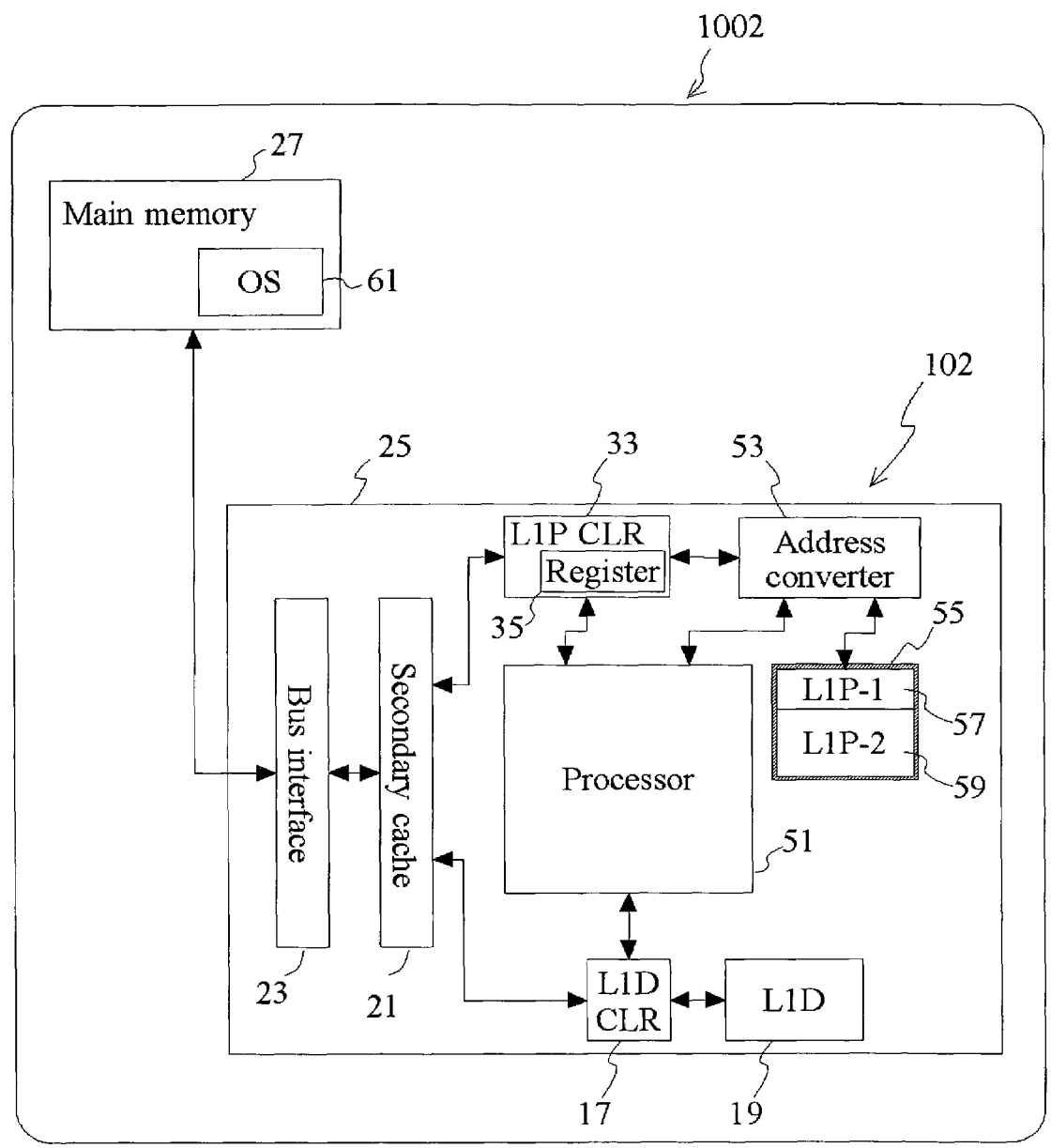
[FIG. 2] Block diagram to describe another example of a computer system to which the present invention applies.

Next, the second embodiment of the present invention is described with reference to FIG. 2. FIG. 2 is a block diagram for describing computer systems related to the second embodiment of the present invention.

A computer system 1002 that is an embodiment of the present invention has a CPU 102 and a main memory 27, similar to the computer system 1001 described in the first embodiment. The CPU 102, similar to the CPU 101 in the first embodiment, is a single LSI chip in which a core part for operation and control, a cache, and an external interface are integrated on a board 25. The CPU 102 is equipped with a processor 51, a primary instruction cache controller 33, an address converter 53, a primary instruction cache memory 55, a primary data cache controller 17, a primary data cache memory 19, a secondary cache 21, and a bus interface 23. The CPU 102 is connected through the bus interface 23 to the main memory 27 that is the main memory of the computer system 1002. When the computer system 1002 is turned on, the OS 61, which makes the CPU 102 work as an information processing device, is loaded in the main memory 27. The configuration elements of the computer system 1002 mentioned above assign the same code for the same configuration element as the computer system 1008 described as the prior art and the computer system 1001 described as the embodiment 1 of the present invention, so further description will be omitted.

The processor 51 in the CPU 102, similar to the processor 31 related to the embodiment 1, has four working modes, referred to as working modes 0 through 3, with different privilege levels, and it can have all the features that the processor 31 has. This means that the processor 51 has functions in which, when it changes working mode, it writes data into the register 35 and changes the status of the register 35 to indicate the working mode of the processor 51. In the processor 51, the working mode with the highest privilege level is 0, and the working mode with the lowest privilege level is 3, similar to the processor 31.

The primary instruction cache memory 55 in this embodiment is comprised of a single SRAM, but it can be used by being logically dividing into a first area 57 and a second area 59. Then the first area 57 is used as an exclusive cache area exclusively used in working mode 0 for the processor 51, and the second area 59 is used as a common cache area used by all working modes 1 through 3 for the processor 51. The correspondence relationship between the address space of data that the processor 51 requests and the data storage location in each area for the primary instruction cache memory 55 is aligned by the address converter 53. The address converter 53 checks the status of the register 35 and converts the address of the data requested by the processor 51 to map the address space of data requested by the processor 51 with the data storage structure on the first area 57 if the status of the register 35 indicates working mode 0 of the CPU. With this, the first area 57 can be an exclusive cache area exclusively used in working mode 0 of the processor 51.

In addition, the address converter 53 converts the address of the data requested from the processor 51 to map the address space of data requested by the processor 51 with the data storage structure of the second area 59 if the status of the register 35 indicates either one of working modes 1 through 3 of the CPU. The second area 59 can be a common cache area used in all of working modes 1 through 3 of the processor 51. However, if the OS 61 uses only two working modes—0 and 3—Of the processor 51 as well as the OS 29 in the first embodiment, the second area 59 will virtually be an exclusive cache area for working mode 3.

The primary instruction cache memory 55 indicated in FIG. 3 is logically divided into two areas, but the following embodiment is also possible: logically dividing it into four to assign an exclusive cache area for each of all working modes of the processor 51. In this case, the address converter 53 must be configured to perform the address conversion process allowing the correct correspondence between the data storage structure of each exclusive cache area and the address space of data requested by the processor 51.

Preferably, the data storage structure of the first area 57 and the second area 59 have a structure for storing data corresponding to lower bits (entry address) of the address of the data requested by the processor 51 as well as the data storage structure in conventional cache memory.

The division number and size of divided segments (volume) in the primary instruction cache memory 55 may be fixed, but preferably they are variable. Because logical division of the cache memory 55 virtually depends on the address conversion by the address converter 53, this address conversion function must be variable for the number and size of the logical division. It can be configured to realize only the number and size of a certain division because the contiguous variable makes the logical circuit of the address converter 53 complex. As an example of such address converter 53, the following configuration can be considered: having an address conversion mode using 2 as the number of the logical division and an address conversion mode using 4. In addition, in the case in which the size of cache memory 55 is 64 KB, the following configuration can be considered: if the number of the logical division is 2, it can have an address conversion mode assigning 32 KB for each area and an address conversion mode assigning 16 KB for an area and 48 KB for the other area.

Switching of the address conversion mode for the address converter 53 is directly performed by instructions from the processor 51. These instruction from the processor 51 may be configured to be directly sent by the processor 51 to the address converter 53 or may be configured as follows: the register 35 is extended to indicate the address conversion mode instructed by the processor 51 and the processor 51 sends instructions through the register 35.

Preferably, the timing of switching the address conversion mode for the address converter 53 described above can be independently determined by the processor 51. This function is implemented by software (firmware) embedded into the processor 51 or a circuit allowing the dynamic reconfiguration. The firmware monitors the number of working modes used by the OS or applications and data size of data frequently used in each working mode to determine the number and size of the logical division for the cache memory 55 to decrease the frequency of access the main memory by the processor 51 as little as possible. This means that the most appropriate address conversion mode is selected for the address converter 53. With such a configuration, the CPU 102 able to restrict the number of accesses to the main memory when switching the working mode by supporting various operating systems.

Instructions to change the number of the logical division or the size of divided segments in the cache memory 55 can also be implemented in the OS 61. This can be implemented as instructions switching the address conversion mode for the address converter 53. In this case, the processor 51 must have the function of controlling the address conversion mode for the address converter 53 by understanding such instructions.

Next, the behavior of the computer system 1002 is described.

The OS 61, similar to the OS 29 of the computer system 1001 related to Embodiment 1, changes the working mode for the processor 51 to the highest privilege level 0 when executing programs for kernel mode and to the lowest privilege level 3 when executing programs for user mode.

When the OS 61 executes programs for kernel mode, the processor 51 works in working mode 0, and the status of the register 35 indicates that the processor 51 works in working mode 0. The address converter 53 associates the address of the data requested by the processor 51 with the data storage location to which the first area 57 of the primary instruction cache memory 55 corresponds. Therefore, the processor 51 solely accesses only the first area 57 in the cache memory 55. In working mode 0, data frequently used by the processor 51 in working mode 0 is stored in the first area 57. If required data is not stored in the first area 57, the processor 51 must retrieve the data from the main memory 27. However, once data is stored in the first area 57, when the processor 51 needs the data the next time, it can obtain the data from the first area 57.

Next, in order to execute programs for user mode, the OS 61 sends instructions to the processor 51 for switching the working mode to 3. The processor 51, which received the mode switch instruction, switches its own working mode to 3 and changes the status of the register 35 to indicate that the processor 51 is working in mode 3. Thereby, the address converter 53 associates the address of the data requested by the processor 51 with the data storage location to which the second area 59 of the primary instruction cache memory 55 corresponds. Therefore, the processor 51 solely accesses only the second area 59 in the cache memory 55 and cannot access the first area 57. Data frequently used by the processor 51 in working mode 3 is stored in the second area 59.

At this point, the OS 61 switches the working mode for the processor 51 to 0 again in order to execute programs for kernel mode. Then, the processor 51 is disconnected from the second area 59 and connected to the first area 57 by the address converter 53. Because data frequently used by the processor 51 in working mode 0 is left in the first area 57, the processor 51 can immediately obtain data frequently used in working mode 0 from the first area 57. Therefore, the need for the processor 51 to access the main memory 27 after switching the working mode decreases in comparison to that of the prior art, and the processor 51 can obtain required data for a short time.

In the same manner, consider that the OS 61 switches the working mode for the processor 51 to 3 in order to execute programs for user mode. Then, the processor 51 is connected to the second area 59 by the address converter 53. Because data frequently used by the processor 51 in working mode 3 is left in the second area 59, the processor 51 can immediately obtain data frequently used in working mode 3 from the second area 59.

In the embodiment described above, only the primary instruction cache 55 is divided to provide exclusive cache areas supporting working modes for the processor, but exclusive cache areas can be provided in a similar manner to the primary data caches 17 and 19 or the second cache 17. In addition, even for the cache in an architecture in which the primary cache is not divided between instruction cache and a data cache, providing exclusive cache areas such as those described above is also possible. Furthermore, computer systems in which a third cache is provided between the CPU 102 and the main memory 27 also exist, but even in this case, exclusive cache areas supporting working modes for the processor can be provided in the third cache in the same manner described above.

As described above, in the computer system 1002 that is the second embodiment of the present invention, the number of accesses by the processor to the main memory after switching the working mode of the processor can be fewer than those in the prior art, as in the computer system 1001 that is the first embodiment of the present invention. Therefore, even in the computer system 1002 that is the second embodiment of the present invention, electrical power consumed while the processor waits for data from the main memory and electrical power required by the processor accessing the main memory can be saved. Furthermore, when the processor 51 is a processor having pipelines, the occurrence of the pipeline obstruction caused by the data transfer delay can be decreased, and electrical power consumed during the pipeline obstruction can also be saved. Because some applications switch between kernel mode and user mode hundreds or thousands of times per second, the effect of saving electrical power by the embodiment described here is significantly high.

The computer system 1002 related to the second embodiment has an advantage in that it can more flexibly optimize the cache access with processors according to the OS or applications compared to the computer system 1001 related to the first embodiment. On the other hand, the computer system 1001 related to the first embodiment has an advantage in that the manufacturing is easier than the computer system 1002.

Preferably, high-speed SRAM is used for the cache memories 19, 21, 39, 41, and 55 used in the first embodiment and second embodiment. As for the main memory 27, low-speed and inexpensive DRAM may be used. The CPU 101 related to the first embodiment and the CPU 102 related to the second embodiment can be sold as a product by mounting them on a lead frame and enclosing them with a molded resin. In addition, the computer system 1001 related to the first embodiment of the present invention and the computer system 1002 related to the second embodiment can be appropriately applied to the CPU or DSP of mobile electronics devices such as cell phones, PDAs, laptop computers, mobile TV receivers, mobile music/movie players, digital cameras, and video recorders, because of its effectiveness in saving electrical power. Furthermore, network devices such as routers in which the working mode of the processor frequently switches are also an appropriate application target.

The description of the best embodiment of the present invention ends here. The scope of the present invention is not limited to the configuration described above, and various embodiments can be included to the extent of the principal idea of the present invention. For example, in the second embodiment, an example of the following embodiment was described: part of a storage medium is logically divided and exclusive memory areas are established. Not only such embodiment but also the following configuration is possible: multiple storage media is logically assumed to be a volume, and part of the logical volume is divided to establish exclusive memory areas.

The invention claimed is:

1. A computer system comprising:
a processor comprising a first working mode, and a second working mode having a different privilege level from said first working mode;
a first instruction cache memory area configurable to store program instructions read from main memory and that is accessed by said processor during said first working mode, where the instructions stored in the first instruction cache are the same as instructions stored in the main memory;
a second instruction cache memory area configurable to store program instructions read from main memory and that is accessed by said processor during said second working mode, where the instructions stored in the second instruction cache are the same as instructions in the main memory; and
circuitry configurable to respond to a current working mode to automatically select one of said first instruction cache memory area or said second instruction cache memory area to provide program instructions to be executed by said processor.

2. A computer system according to claim 1, comprising circuitry for changing a size of said first instruction cache and second instruction cache memory areas.

3. A computer system according to claim 1, comprising circuitry for changing a size of said first instruction and second instruction cache memory areas autonomously.

4. A computer system according to claim 1, wherein at least one of said first instruction cache or second instruction cache memory areas is comprised of SRAM.

5. A computer system according to claim 1, wherein:
data imported from outside is stored in said first instruction cache memory area when said processor is in said first working mode, and data imported from outside is stored in said second instruction cache memory area when said processor is in said second working mode.

6. A computer system according to claim 1, wherein said first instruction cache memory area and said instruction cache second memory area separately exist on physically different storage media.

7. A computer system according to claim 1, wherein said first instruction cache memory area and said second instruction cache memory area exist in different logical partitions on the same storage medium.

8. A computer system according to claim 7, wherein said circuitry is responsive to an address generated by said processor to connect said processor to an associated one of the logical sections of the first instruction cache memory area or the second instruction cache memory area.

9. A computer system according to claim 1, wherein the computer system is integrated into a single-chip LSI.

10. A computer system according to claim 1, wherein the computer system is a mobile electronics device.

11. A computer program, collaborating with the computer system according to claim 1 and comprising instructions to instruct said processor of changes in the number or size of said first instruction cache or said second instruction cache memory areas.

12. A method, comprising:
operating a data processor in a first working mode by reading program instructions from a first instruction cache, where the instructions read from the first instruction cache are the same as instructions stored in main memory;
switching the data processor to a second working mode having a lower privilege level than the first working mode; and
operating the data processor in the second working mode by reading program instructions from a second instruction cache, where the instructions read from the second instruction cache are the same as instructions stored in the main memory; where
the steps of operating include automatically selecting, based at least on memory addresses generated by the data processor, either the first instruction cache or the second instruction cache to provide program instructions to be executed by the data processor.

13. The method of claim 12, where the first instruction cache is embodied in a first memory medium, and where the second instruction cache is embodied in a second memory medium.

14. The method of claim 12, where the first instruction cache and the second instruction cache are embodied in a single memory medium.

15. The method of claim 12, where at least the first instruction cache is operated as a set-associate instruction cache.

16. The method of claim 12, executed within an integrated circuit that comprises said data processor and said first and second instruction caches.

17. The method of claim 12, executed within a mobile electronics device.

18. The method of claim 12, where the first instruction cache is an exclusive memory area for the first working mode and the second instruction cache is an exclusive memory area for the second working mode.

19. An integrated circuit, comprising:
a first memory configurable to store a first instruction cache;
a second memory configurable to store a second instruction cache;
a data processor configurable to operate in a first working mode by reading program instructions from the first instruction cache, where the instructions read from the first instruction cache are the same as instructions stored in main memory, and to operate in a second working mode by reading program instructions from the second instruction cache, where the instructions read from the second instruction cache are the same as instructions in the main memory, where the first working mode operates with a higher privilege level than the second working mode; and
circuitry configurable to select, based at least on memory addresses generated by said data processor, either the first memory or the second memory to provide program instructions to be executed by said data processor.

20. The integrated circuit of claim 19, where the first memory and the second memory comprise two physically distinct memory medium.

21. The integrated circuit of claim 19, where the first memory and the second memory comprise a single memory medium.

22. The integrated circuit of claim 19, where at least the first instruction cache is operated as a set-associate instruction cache.

23. The integrated circuit of claim 19, embodied within a mobile electronics device.

24. The integrated circuit of claim 19, where the first instruction cache is an exclusive memory for the first working mode and the second instruction cache is an exclusive memory for the second working mode.

* * * * *